United States Patent [19]

Hartitz

[11] 4,143,030

[45] Mar. 6, 1979

[54] SMOKE RETARDANT VINYL CHLORIDE AND VINYLIDENE CHLORIDE POLYMER COMPOSITIONS

[75] Inventor: Joachim E. Hartitz, Avon Lake, Ohio

[73] Assignee: The B. F. Goodrich Company, Akron, Ohio

[21] Appl. No.: 770,326

[22] Filed: Feb. 22, 1977

[51] Int. Cl.$^2$ ............................ C08K 3/38; C08K 3/22
[52] U.S. Cl. ...................... 260/45.75 B; 260/42.49; 260/45.7 RT
[58] Field of Search ................. 260/45.75 B, 45.7 RL, 260/2.5 FP, 42.49

[56] References Cited

U.S. PATENT DOCUMENTS

| | | | |
|---|---|---|---|
| 3,957,723 | 5/1976 | Lawson et al. | 260/42.49 |
| 3,975,359 | 8/1976 | Dickens | 260/45.75 B |
| 3,985,706 | 10/1976 | Kay | 260/42.47 |
| 4,001,174 | 1/1977 | Yagi et al. | 260/45.75 R |
| 4,010,139 | 3/1977 | Bertelli | 260/45.75 B |

OTHER PUBLICATIONS

Fire and Flammability Series-vol. 71, pp. 263 to 275-Article by Sobolev, Technomic Pub. Co., Conn., 1974.

Primary Examiner—V. P. Hoke
Attorney, Agent, or Firm—Joe A. Powell

[57] ABSTRACT

Vinyl chloride and vinylidene chloride polymer compositions containing alumina trihydrate and bismuth-subcarbonate, produce decreased amounts of smoke on burning.

8 Claims, No Drawings

4,143,030

SMOKE RETARDANT VINYL CHLORIDE AND VINYLIDENE CHLORIDE POLYMER COMPOSITIONS

BACKGROUND OF THE INVENTION

Vinyl chloride and vinylidene chloride polymers are known to be self-extinguishing and relatively more flame retardant than other polymers such as polyethylene, polypropylene and the like. However, a substantial amount of smoke may be produced upon exposure of vinyl chloride and vinylidene chloride polymers to a flame. Conventional flame retardants such as antimony oxide do not aid in smoke reduction.

U.S. Pat. No. 3,957,723 discloses a mixture of alumina trihydrate and zinc oxide as smoke retardant in vinyl chloride polymers. U.S. Pat. No. 3,985,706 discloses a mixture of alumina trihydrate and zinc borate as a smoke suppressant for vinyl chloride polymers. U.S. Pat. No. 3,975,359 discloses mixtures of certain nickel compounds and bismuth compounds including Bismuth-subcarbonate as smoke retardants for vinyl chloride and vinylidene chloride polymers.

SUMMARY OF THE INVENTION

Vinyl chloride and vinylidene chloride polymer compositions which produce decreased amounts of smoke upon burning are obtained by including therein a mixture of (A) from about 5 to about 150 weight parts per 100 weight parts of polymer of $Al_2O_3.3H_2O$ (alumina trihydrate) and (B) from about 0.25 to about 20 weight parts per 100 weight parts of polymer of $Bi_2O_2CO_3$ (Bismuth-subcarbonate).

DETAILED DESCRIPTION

The amount of $Al_2O_3.3H_2O$ used is from about 5 to about 150 weight parts per 100 weight parts of polymer. Preferably, the amount of $Al_2O_3.3H_2O$ used is from about 20 to about 60 weight parts per 100 weight parts of polymer. The $Al_2O_3.3H_2O$ used normally is a fine powder with an average particle size of from about 0.1 to about 200 microns, more preferably from about 0.5 to about 100 microns. When amounts greater than 20 weight parts of $Al_2O_3.3H_2O$ are used, it is preferred to use a small particle size of not greater than about 5 microns. A particularly desirable $Al_2O_3.3H_2O$ is one made by a precipitation process and having a particle size of from 1 to 2 microns and sold under the designation of HYDRAL.

The amount of $Bi_2O_2CO_3$ used is from about 0.25 to about 20 weight parts per 100 weight parts of polymer. Preferably the amount of $Bi_2O_2CO_3$ used is from about 2 to about 10 weight parts per 100 weight parts of polymer. The $Bi_2O_2CO_3$ used is a fine white powder with an average particle size less than about 200 microns, more preferably from about 0.5 to about 5 microns.

Vinyl chloride and vinylidene chloride polymers used in this invention include homopolymers, copolymers and blends of homopolymers and/or copolymers. The vinyl chloride and vinylidene chloride polymers may contain from 0 up to about 50% by weight of at least one other olefinically unsaturated monomer, more preferably at least one other vinylidene monomer (i.e., a monomer containing at least one terminal $CH_2 = C <$ group per molecule) copolymerized therewith, even more preferably up to about 20% by weight of such monomer. Suitable monomers include 1-olefins containing from 2 to 12 carbon atoms, more preferably from 2 to 8 carbon atoms, such as ethylene, propylene, 1-butene, isobutylene, 1-hexene, 4-methyl-1-pentene and the like; dienes containing from 4 to 10 carbon atoms including conjugated dienes as butadiene, isoprene, piperylene, and the like; ethylidene norbornene and dicyclopentadiene; vinyl esters and allyl esters such as vinyl acetate, vinyl chloroacetate, vinyl propionate, vinyl laurate, allyl acetate and the like; vinyl aromatics such as styrene, α-methylstyrene, chlorostyrene, vinyl toluene, vinyl naphthalene and the like; vinyl and allyl ethers and ketones such as vinyl methyl ether, allyl methyl ether, vinyl isobutyl ether, vinyl n-butyl ether, vinyl chloroethyl ether, methyl vinyl ketone and the like; vinyl nitriles such as acrylonitrile, methacrylonitrile and the like; cyanoalkyl acrylates such as α-cyanomethyl acrylate, the α-, β- and γ-cyanopropyl acrylates and the like; olefinically unsaturated carboxylic acids and esters thereof, including α,β-olefinically unsaturated acids and esters thereof such as methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethoxyethyl acrylate, hexylthioethyl acrylate, methylmethacrylate, ethyl methacrylate, butyl methacrylate, glycidyl methacrylate and the like, and including esters of maleic and fumaric acid and the like; amides of the α,β-olefinically unsaturated carboxylic acids such as acrylamide and the like; divinyls, diacrylates and other polyfunctional monomers such as divinyl benzene divinyl ether, diethylene glycol diacrylate, ethylene glycol dimethacrylate, methylene-bis-acrylamide, allyl pentaerythritol, and the like; and bis(β-haloalkyl) alkenyl phosphonates such as bis(β-chloroethyl) vinyl phosphonate and the like.

More preferred monomers include 1-olefins containing from 2 to 12 carbon atoms, more preferably from 2 to 8 carbon atoms, such as ethylene, propylene, 1-butene, isobutylene, 1-hexene, 4-methyl-1-pentene and the like; vinyl esters and allyl esters such as vinyl acetate, vinyl chloroacetate, vinyl propionate, vinyl laurate, allyl acetate and the like; olefinically unsaturated carboxylic acids and esters thereof, including α,β-olefinically unsaturated acids and esters thereof such as methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethoxyethyl acrylate, hexylthioacrylate, methyl methacrylate and the like, and including esters of maleic and fumaric acid and the like; and amides of α,β-olefinically unsaturated carboxylic acids such as acrylamide and the like.

The vinyl chloride and vinylidene chloride polymers may be prepared by any method known to the art such as by emulsion, suspension, bulk or solution polymerization. The additive compounds may be mixed with the polymer emulsion, suspension, solution or bulk mass before monomer recover and/or drying. More preferably the compounds may be mixed with dry granular or powdered polymers. The polymer and compounds may be mixed thoroughly in granular or powder form in apparatus such as a Henschel mixer or the like. Alternatively, this step may be eliminated and the mixing done while the polymer mass is fluxed, fused and masticated to homogeneity under fairly intensive shear in or on a mixer apparatus having its metal surface in contact with the material. The fusion temperature and time will vary according to the polymer composition and level of additive compounds but will generally be in the range of about 300° to 400° F. and 2 to 10 minutes.

Smoke retardancy may be measured using a NBS Smoke Chamber according to procedures described by Gross et al, "Method for Measuring Smoke from Burning Materials", *Symposium on Fire Test Methods — Restraint & Smoke* 1966, ASTM STP 422, pp. 166–204. Maximum smoke density ($D_m$) is a dimensionless number and has the advantage of representing a smoke density independent of chamber volume, specimen size or photometer path length, provided a consistent dimensional system is used. Maximum rate of smoke generation ($R_m$) is defined in units of min.$^{-1}$. Percent smoke reduction is calculated using this equation:

$$\frac{D_m/g \text{ of sample} - D_m/g \text{ of control}}{D_m/g \text{ of control}} \times 100$$

The term $D_m/g$ means maximum smoke density per gram of sample. $D_m$ and other aspects of the physical optics of light transmission through smoke are discussed fully in the above ASTM publication.

The vinyl chloride and vinylidene chloride polymer compositions of this invention may contain the usual compounding ingredients known to the art such as fillers, stabilizers, opacifiers, lubricants, processing aids, impact modifying resins, plasticizers, antioxidants and the like.

The following examples illustrate the present invention more fully.

EXAMPLES 1–3

The following recipe was used:

| MATERIAL | PARTS |
| --- | --- |
| Polyvinyl chloride[1] | 100 |
| Lubricant[2] | 2 |
| Stabilizer[3] | 2 |
| $Al_2O_3 \cdot 3H_2O$[4] | Variable |
| $Bi_2O_2CO_3$[5] | Variable |

[1]Homopolymer having an inherent viscosity of about 0.90–0.94.
[2]Polyethylene powder having a melt index of 5 and a specific gravity of 0.92.
[3]Dibutyl tin dithioglycolate
[4]Average particle size of 1 micron.
[5]Average particle size less than 5 microns.

Each experimental sample is prepared by milling the recipe material on a two-roll mill for about 5 minutes at a roll surface temperature of about 320° F. The milled samples are pressed into 6 in. × 6 in. × 0.035 in. sheets. Pressing is done at about 350° F.–370° F. using 40,000 lbs. of force applied to a 4-inch ram. The samples are given a two-minute preheat prior to pressing for eight minutes under full load.

The molded samples are cut into 3 in. × 3 in. × 0.035 in. sections. The sections are tested using the flaming mode of the NBS Smoke Chamber Test (ASTM STP 422, pp. 166–204) described heretofore. Test results are given in Table I.

TABLE I

| EXAMPLE | $Al_2O_3 \cdot 3H_2O$ (phr) | $Bi_2O_2CO_3$ (phr) | Maximum Smoke Density Per Gram of Sample ($D_m/g$) | Smoke Reduction (%) |
| --- | --- | --- | --- | --- |
| Control | None | None | 64.6 | — |
| 1 | 20 | None | 35.8 | 44.6 |
| 2 | None | 20 | 33.3 | 48.5 |
| 3 | 10 | 10 | 23.8 | 63.2 |

The above results demonstrate that $Al_2O_3 \cdot 3H_2O$ and $Bi_2O_2CO_3$ act synergistically to retard smoke formation during burning of polyvinyl chloride in the NBS Smoke Chamber (ASTM STP 422, pp. 166–204). In Example 3, 10 parts by weight of each of the two ingredients shows a higher percent reduction of smoke than either Example 1, which has 20 parts by weight of $Al_2O_3 \cdot 3H_2O$ or Example 2, which has 20 parts by weight of $Bi_2O_2CO_3$.

The percent smoke reduction values can be varied from those shown in Examples 1–3 by varying the ratios of $Al_2O_3 \cdot 3H_2O$ and $Bi_2O_2CO_3$. Different ratios than those shown could be used in actual practice depending on the desired smoke reduction and the end use of the product.

The improved vinyl chloride and vinylidene chloride polymer compositions of this invention are useful wherever smoke reduction is desirable, such as carpets, house siding, plastic components for airplane interiors, and the like. Of course, overall suitability for a particular use will depend upon other factors as well, such as comonomer type and level, compounding ingredient type and level, polymer particle size, etc.

I claim:

1. A smoke retardant composition comprising
   (a) a vinyl chloride or vinylidene chloride polymer,
   (b) from about 5 to about 150 weight parts of $Al_2O_3 \cdot 3H_2O$ per 100 weight parts of polymer, and
   (c) from about 0.25 to about 20 weight parts of $Bi_2O_2CO_3$ per 100 weight parts of polymer.

2. A composition of claim 1 wherein said $Al_2O_3 \cdot 3H_2O$ has an average particle size of from about 0.1 to about 200 microns.

3. A composition of claim 2 wherein said $Bi_2O_2CO_3$ has an average particle size of from about 0.1 to about 200 microns.

4. A composition of claim 3 wherein said $Al_2O_3 \cdot 3H_2O$ has an average particle size of from about 1 to about 5 microns.

5. A composition of claim 4 wherein the level of $Al_2O_3 \cdot 3H_2O$ is from about 20 weight parts to about 60 weight parts per 100 weight parts of polymer.

6. A composition of claim 5 wherein the level of $Bi_2O_2CO_3$ is from about 2 weight parts to about 10 weight parts per 100 weight parts of polymer.

7. A composition of claim 6 wherein said polymer contains copolymerized therewith up to about 50% by weight of at least one other olefinically unsaturated monomer.

8. A composition of claim 7 wherein said other monomer is selected from the group consisting of 1-olefins containing from 2 to 12 carbon atoms, vinyl esters, α, β-olefinically unsaturated carboxylic acids and esters thereof, amides of α, β-olefinically unsaturated carboxylic acids, and esters of fumaric and maleic acid.

* * * * *